United States Patent
Ghai et al.

(10) Patent No.: US 8,213,913 B2
(45) Date of Patent: Jul. 3, 2012

(54) PROVIDING LOCATION BASED SERVICES FOR MOBILE DEVICES

(75) Inventors: Rajat Ghai, Sandwich, MA (US); Kaitki Agarwal, Westford, MA (US)

(73) Assignee: Cisco Technology, Inc., San Jose, CA (US)

( * ) Notice: Subject to any disclaimer, the term of this patent is extended or adjusted under 35 U.S.C. 154(b) by 852 days.

(21) Appl. No.: 11/952,956

(22) Filed: Dec. 7, 2007

(65) Prior Publication Data
US 2008/0176582 A1 Jul. 24, 2008

Related U.S. Application Data

(60) Provisional application No. 60/873,493, filed on Dec. 7, 2006.

(51) Int. Cl.
*H04M 3/42* (2006.01)
(52) U.S. Cl. ............... 455/414.2; 455/414.4; 455/432.3; 455/456.1; 455/456.2; 455/456.3; 707/812; 707/912; 707/913; 707/918
(58) Field of Classification Search ....... 455/432.1–453, 455/456.1–456.3; 370/328–333
See application file for complete search history.

(56) References Cited

U.S. PATENT DOCUMENTS

| | | | |
|---|---|---|---|
| 6,138,156 A | 10/2000 | Fletcher et al. | |
| 6,327,471 B1 * | 12/2001 | Song | 455/440 |
| 6,431,875 B1 | 8/2002 | Elliott et al. | |
| 6,477,590 B1 | 11/2002 | Habusha et al. | |
| 6,687,252 B1 | 2/2004 | Bertrand et al. | |
| 6,714,987 B1 | 3/2004 | Amin et al. | |
| 6,775,273 B1 | 8/2004 | Kung et al. | |
| 6,778,494 B1 | 8/2004 | Mauger | |
| 6,810,259 B1 * | 10/2004 | Zhang | 455/456.5 |
| 6,847,991 B1 | 1/2005 | Kurapati | |
| 6,853,630 B1 | 2/2005 | Manning | |
| 6,854,014 B1 | 2/2005 | Amin et al. | |
| 6,888,821 B2 | 5/2005 | Rasanen et al. | |
| 6,973,309 B1 | 12/2005 | Rygula et al. | |
| 6,978,380 B1 | 12/2005 | Husain et al. | |
| 7,454,206 B1 | 11/2008 | Phillips et al. | |
| 7,613,836 B2 | 11/2009 | Tober et al. | |

(Continued)

FOREIGN PATENT DOCUMENTS

EP 1414212 4/2004

(Continued)

OTHER PUBLICATIONS

International Search Report and Written Opinion for PCT Application No. PCT/US07/86808 issued on Apr. 10, 2008.

(Continued)

*Primary Examiner* — Dai A Phuong
(74) *Attorney, Agent, or Firm* — Wilmer Cutler Pickering Hale and Dorr LLP

(57) ABSTRACT

Systems and methods are provided that allow the delivery of location based services within a communication network. The location information can be retrieved using information from the mobile node when the mobile node registers in the network. The location information can then be cached or stored in one or more places in the communication network and correlated with the mobile node's addressing information. If a request for location based services is received without location based information, the gateway can use location based information regarding the mobile node to provide location based services. The gateway can enable non IMS mobile nodes to obtain IMS location based services or incompatible mobile nodes to obtain location based services.

20 Claims, 9 Drawing Sheets

U.S. PATENT DOCUMENTS

| | | | |
|---|---|---|---|
| 2002/0029260 A1 | 3/2002 | Dobbins et al. | |
| 2002/0131404 A1 | 9/2002 | Mehta et al. | |
| 2003/0016630 A1 | 1/2003 | Vega-Garcia et al. | |
| 2003/0050076 A1 | 3/2003 | Watanabe | |
| 2003/0058872 A1 | 3/2003 | Berggreen et al. | |
| 2003/0188012 A1 | 10/2003 | Ford | |
| 2003/0227880 A1 | 12/2003 | Heller et al. | |
| 2004/0006573 A1 | 1/2004 | Takashi | |
| 2004/0047290 A1 | 3/2004 | Komandur et al. | |
| 2004/0054929 A1 | 3/2004 | Serpa | |
| 2004/0068574 A1 | 4/2004 | Costa Requena et al. | |
| 2004/0109414 A1 | 6/2004 | Choi et al. | |
| 2004/0109459 A1 | 6/2004 | Madour et al. | |
| 2004/0111476 A1 | 6/2004 | Trossen et al. | |
| 2004/0122954 A1 | 6/2004 | Shaheen | |
| 2004/0122967 A1 | 6/2004 | Bressler et al. | |
| 2004/0137918 A1 | 7/2004 | Varonen et al. | |
| 2004/0139230 A1 | 7/2004 | Kim | |
| 2004/0224688 A1 | 11/2004 | Fischer | |
| 2005/0002381 A1 | 1/2005 | Westman et al. | |
| 2005/0005025 A1 | 1/2005 | Harville et al. | |
| 2005/0009520 A1 | 1/2005 | Herrero et al. | |
| 2005/0021713 A1 | 1/2005 | Dugan et al. | |
| 2005/0083974 A1 | 4/2005 | Mayer et al. | |
| 2005/0111450 A1 | 5/2005 | Miyamoto et al. | |
| 2005/0124341 A1 | 6/2005 | Myllymaki et al. | |
| 2005/0190740 A1 | 9/2005 | Zhao et al. | |
| 2005/0201357 A1 | 9/2005 | Poyhonen | |
| 2005/0204052 A1 | 9/2005 | Wang et al. | |
| 2005/0233727 A1 | 10/2005 | Poikselka et al. | |
| 2006/0031559 A1 | 2/2006 | Sorokopud et al. | |
| 2006/0046714 A1 | 3/2006 | Kalavade | |
| 2006/0058056 A1 | 3/2006 | Das et al. | |
| 2006/0067244 A1 | 3/2006 | Sekaran et al. | |
| 2006/0104431 A1 | 5/2006 | Emery et al. | |
| 2006/0146792 A1 | 7/2006 | Ramachandran et al. | |
| 2006/0155871 A1 | 7/2006 | Ilkka et al. | |
| 2006/0193295 A1 | 8/2006 | White et al. | |
| 2006/0211423 A1 | 9/2006 | Ejzak et al. | |
| 2006/0239255 A1 | 10/2006 | Ramachandran et al. | |
| 2006/0251050 A1 | 11/2006 | Karlsson | |
| 2006/0256751 A1 | 11/2006 | Jagadeesan et al. | |
| 2006/0256779 A1 | 11/2006 | Lim et al. | |
| 2006/0264213 A1 | 11/2006 | Thompson | |
| 2006/0270404 A1 | 11/2006 | Tuohino et al. | |
| 2007/0022199 A1 | 1/2007 | Tatsubori | |
| 2007/0025301 A1 | 2/2007 | Petersson et al. | |
| 2007/0036078 A1 | 2/2007 | Chowdhury et al. | |
| 2007/0036079 A1 | 2/2007 | Chowdury et al. | |
| 2007/0041320 A1 | 2/2007 | Chen et al. | |
| 2007/0058561 A1 | 3/2007 | Virgile | |
| 2007/0066286 A1 | 3/2007 | Hurtta | |
| 2007/0076729 A1 | 4/2007 | Takeda | |
| 2007/0082681 A1 | 4/2007 | Kim et al. | |
| 2007/0097967 A1 | 5/2007 | Kauppinen et al. | |
| 2007/0156869 A1 | 7/2007 | Galchev et al. | |
| 2007/0206515 A1 | 9/2007 | Andreasen et al. | |
| 2007/0206617 A1 | 9/2007 | Andreasen et al. | |
| 2007/0209061 A1 | 9/2007 | Dekeyzer et al. | |
| 2007/0253371 A1 | 11/2007 | Harper et al. | |
| 2007/0254673 A1 | 11/2007 | Stenberg et al. | |
| 2008/0002592 A1 | 1/2008 | Yegani et al. | |
| 2008/0020775 A1 | 1/2008 | Willars | |
| 2008/0052387 A1 | 2/2008 | Heinz et al. | |
| 2008/0084867 A1 | 4/2008 | Foti et al. | |
| 2008/0095339 A1 | 4/2008 | Elliott et al. | |
| 2008/0130637 A1 | 6/2008 | Kant et al. | |
| 2008/0137541 A1 | 6/2008 | Agarwal et al. | |
| 2008/0219218 A1 | 9/2008 | Rydnell et al. | |
| 2008/0233947 A1 | 9/2008 | Herrero-Veron | |
| 2008/0254768 A1 | 10/2008 | Faccin | |
| 2008/0261557 A1* | 10/2008 | Sim ........................... 455/404.2 | |
| 2009/0054037 A1 | 2/2009 | Kaippallimalil | |
| 2009/0109845 A1 | 4/2009 | Andreasen et al. | |
| 2009/0285225 A1 | 11/2009 | Dahod | |
| 2010/0067444 A1* | 3/2010 | Faccin et al. .................. 370/328 | |
| 2011/0199978 A1* | 8/2011 | Phan-Anh et al. ............. 370/328 | |

FOREIGN PATENT DOCUMENTS

| | | |
|---|---|---|
| EP | 2092766 | 8/2009 |
| WO | WO-01/22642 | 3/2001 |
| WO | WO-2007/081727 | 7/2007 |
| WO | WO-2008/070869 | 6/2008 |
| WO | WO-2009/067445 | 5/2009 |

OTHER PUBLICATIONS

International Search Report and Written Opinion for PCT Application No. PCT/US07/86886 mailed Apr. 10, 2008 (4 pages).

International Search Report and Written Opinion issued for International Patent Application No. PCT/US2007/086747 issued on May 7, 2008 (6 pages).

International Search Report and Written Opinion issued for International Patent Application No. PCT/US2007/086802 issued on May 20, 2008 (6 pages).

International Search Report and Written Opinion for corresponding International Patent Application No. PCT/US2007/086884 issued on Apr. 10, 2008 (4 pages).

<http://www.acmepacket.com/html/page.asp?PageID=%7bFB2657BA-EE7A-46CI-BEA8-F650C93BF5C3%7d>printed on Dec. 5, 2009 (19 pages).

<http://www.3gpp.org/ftp/Specs/html-info/24229.htm>printed on Dec. 5, 2009 (4 pages).

CT Labs Report, "SIP and RTP Denial of Service Attack Tests Summary Report", pp. 1-4, 2005.

http://www.3gpp.org, 3GPP TS 24.229 V6.12.0 (Sep. 2006), Oct. 3, 2006 (2 pages).

International Search Report and Written Opinion for PCT Application No. PCT/US2007/000132 mailed on Oct. 2, 2007 (12 pages).

International Search Report and Written Opinion for PCT Application No. PCT/US2008/83911 issued on Jan. 12, 2009 (5 pages).

International Search Report and Written Opinion for corresponding International Patent Application No. PCT/US2009/043696 issued on Jun. 24, 2009 (5 pages).

3GPP TS 23.401 v8.3.0 (Sep. 2009), 3rd Generation Partnership Project; Technical Specification Group Services and System Aspects; General Packet Radio Services (GPRS) enhancements for Evolved Univeral Terrestrial Radio Access Network (E-UTRAN) access (Release 8), http://www.3gpp.org (39 pages).

3GPP TS 29.274 v1.3.0 (Oct. 2010), 3rd Generation Partnership Project; Technical Specification Group Core Network and Terminals; 3GPP Evolved Packet System; Evolved GPRS Tunnelling Protocol for Control Plane (GTPv2-C0; Stage 3 (Release 8); http://www.3gpp.org (1 page).

3GPP TS 36.413 v8.3.0 (Sep. 2008), 3rd Generation Partnership Project; Technical Specification Group Radio Access Network; Evolved Univeral Terrestrial Radio Access Network (E-UTRAN0; S1 Application Protocol (S1AP) (Release 8), http://www.3gpp.org (2 pages).

Nguyen-Vuong. "Mobility Management in $G Wireless Heterogeneous Networks", PhD thesis. Jul. 2, 2008. www.biblio.univ.evry.fr/theses/2008/2008EVRY00007.pdf (225 pages).

International Search Report for International Application No. PCT/US09/64823 mailed Feb. 12, 2010 (1 page).

* cited by examiner

PROVIDING LOCATION BASED SERVICES FOR MOBILE DEVICES

CROSS REFERENCE TO RELATED APPLICATION

This application claims benefit under 35 U.S.C. §119(e) of U.S. Provisional Patent Application No. 60/873,493, entitled "Apparatus and Method for Providing a Call Session Control Function," filed Dec. 7, 2006, which is hereby incorporated by reference herein in its entirety.

FIELD OF THE DISCLOSURE

This disclosure relates to a system and method for providing location information about mobile device within in a communication network.

BACKGROUND

Wireless communication systems and networks are used in connection with many applications, including, for example, satellite communications systems, portable digital assistants (PDAs), laptop computers, and cellular telephones. One significant benefit that users of such applications obtain is the ability to connect to a network (e.g., the Internet) as long as the user is within range of such a wireless communication system.

Current wireless communication systems use either, or a combination of, circuit switching and packet switching in order to provide mobile data services to a mobile node. A mobile node can be a cell phone, a PDA, a Blackberry, a laptop computer with a wireless card, or any other wireless device. Generally speaking, with circuit-based approaches, wireless data is carried by a dedicated (and uninterrupted) connection between the sender and recipient of data using a physical switching path. Once the direct connection is set-up, it is maintained for as long as the sender and receiver have data to exchange. The establishment of such a direct and dedicated switching path results in a fixed share of network resources being tied up until the connection is closed. When the physical connection between the sender and the receiver is no longer desired, it is torn-down and the network resources are allocated to other users as necessary.

Packet-based approaches, on the other hand, do not permanently assign transmission resources to a given call, and do not require the set-up and tear-down of physical connections between a sender and receiver of data. In general, a data flow in packet-based approaches is "packetized," where the data is divided into separate segments of information, and each segment receives "header" information that may provide, for example, source information, destination information, information regarding the number of bits in the packet, priority information, and security information. The packets are then routed to a destination independently based on the header information. The data flow may include a number of packets or a single packet.

With the development of mobile phones, either with circuit switched or packet based voice communications, at first there was no way for an emergency operator to locate where the caller was located. Landline based communication systems automatically provided this information to the operator. At first carriers provided the location of the cell tower or base station to the emergency phone operators and this narrowed the distance down to some miles around the wireless equipment. For more advanced location techniques, carriers have turned to GPS in the handset and cell tower or base station triangulation. However, each one has associated trade-offs. In wide open areas where there are fewer cell towers and less interference, GPS solutions work better than network solutions. In more heavily populated areas, network based solutions work better than GPS, as the GPS can have problems with interference from buildings in a city.

Besides the problems inherent with locating the physical position of a mobile node, packet-based communications are evolving to be increasingly multimedia rich, and a part of this process has been the development of IP Multimedia Subsystem (IMS). IMS is an architectural framework for delivering internet protocol (IP) multimedia to mobile nodes. A call session control function (CSCF) can manage much of the signaling that occurs in an IMS core. The CSCF functionality can be logically divided into three functionalities: a Proxy-CSCF (P-CSCF), an Interrogating CSCF (I-CSCF), and a Serving CSCF (S-CSCF). Additionally, the CSCF functionality is envisioned by two different groups for inclusion in two different topologies: Global System for Mobile Communications (GSM) and CDMA 2000. The $3^{rd}$ Generation Partnership Project (3GPP) is responsible for IMS which works with GSM systems and the $3^{rd}$ Generation Partnership Project 2 (3GPP2) is responsible for Multimedia Domain (MMD) which is used with CDMA systems and is based on the 3GPP IMS concept. However, some mobile nodes may not be able to communicate location information to the network.

SUMMARY OF THE INVENTION

Systems and methods for providing location information about mobile device within in a communication network are disclosed. In some embodiments, a gateway that provides location-based information includes a call session control function (CSCF) residing in the gateway and in communication with a cache, the cache residing in a computer readable medium and storing addressing information for a mobile node and location information for a mobile node, the CSCF creating an entry in the cache when the mobile node registers, the CSCF using registration information to obtain location information and storing the location information in the cache for the mobile node, and the CSCF using location based information to obtain location based services on behalf of the mobile node.

In certain embodiments, a method of providing location based information includes receiving a registration request at a call session control function (CSCF) residing in a gateway, caching information regarding a mobile node in a cache residing in the gateway, retrieving location based information for the mobile node using the information regarding the mobile node, receiving a request for location based services, and routing the request using previously retrieved location based information to route the request on behalf of the mobile node.

DETAILED DESCRIPTION

Systems and methods are provided that allow the delivery of location based services within a communication network. Some embodiments retrieve location information using information from the mobile node when the mobile node registers in the network. This information can be stored in a cache and updated periodically. If the mobile node requests a service which uses location information, the location information can be provided from the cache on behalf of the mobile node to the network. A network device can then provide the location based service to the mobile node.

Knowing a user's physical location enables location based services. Location based service are services that take into account the locale of the subscriber. These services include providing a user with the location or phone number of the nearest particular service, such as operator service, directory assistance, traffic update (e.g., *traffic), the closest cab company, the closest hospital, the closest French food restaurant, etc. Determining the location of a mobile node is made more difficult because of the inherent mobility. In certain embodiments, a user's location is tied to the user's IP address. This can be done in a cache in communication with a registrar function. The user's location can be determined by a variety of ways including from the user's network attachment, such as a base station ID and where that base station is located physically. The location information can be provided in session initiation protocol (SIP) messages. The SIP message can carry a cell ID parameter that can be stored and linked to the user's IP address. Requests from an IP address can then be mapped to a physical location and the physical location can be served to a network device such as an application server.

In some embodiments, a CSCF has a registrar function, which is more fully described below. The registrar function caches the registration records for the IMS or MMD clients. A typical registration record points to current network attachment of the user (i.e., user A is available at IP 10.3.0.10 etc.). This registrar can be modified to keep track of user's physical location as well. Physical location can be derived either from the SIP Registration mechanism by looking at the P-AC-CESS-NETWORK-INFO that has the cell-id parameter or by other out of band mechanisms like presence updates, etc. Once the registrar has the user's physical location, this information can be served to a SIP-AS or emergency-CSCF (E-CSCF) to offer location based services. In some embodiments, the user is presented a graphical user interface (GUI) which is populated with information obtained from an application server based on location, or the user may make a selection in the GUI, which is sent by the mobile device to retrieve the requested information, such as nearby restaurants or the location of friends.

Figure 1:
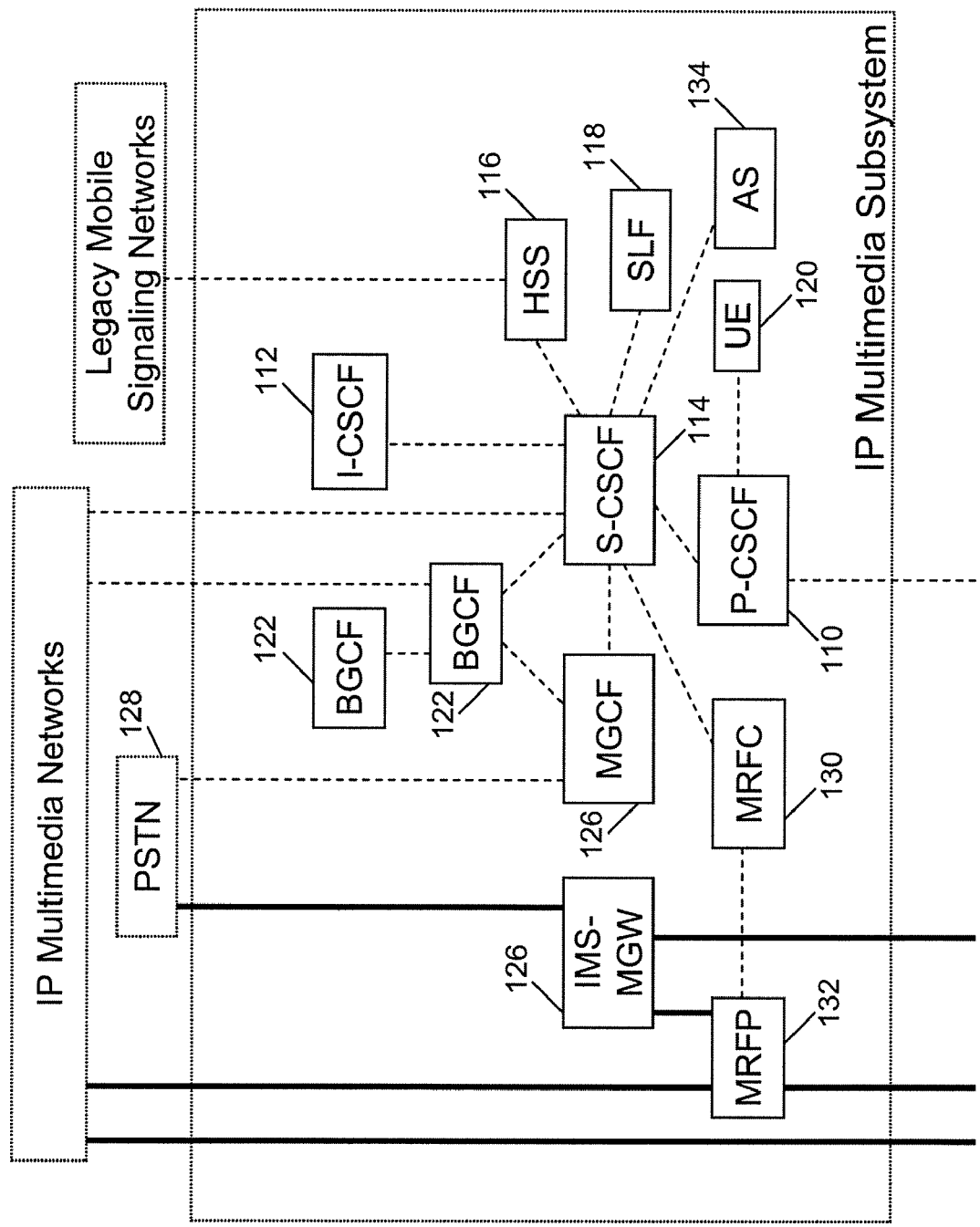
FIG. 1 is a functional block illustration of an IP Multimedia Subsystem (IMS) communication network in accordance with certain embodiments.

FIG. 1 illustrates an IP multimedia subsystem (IMS) where logical components of a network setup are shown in accordance with some embodiments. FIG. 1 includes a P-CSCF 110, an I-CSCF 112, a S-CSCF 114, a Home Subscriber Server (HSS) 116, a Subscriber Location Function (SLF) 118, mobile node or user equipment (UE) 120, Breakout Gateway Control Function (BGCF) 122, Media Gateway Control Function (MGCF) 124, Media Gateway (MGW) 126, Public Switched Telephone Network (PSTN) 128, Multimedia Resource Controller (MRFC) 130, Multimedia Resource Function Processor (MRFP) 132, and application server (AS) 134. HSS 116 is a master user database that supports the S-CSCF or other network entities that handle calls and sessions. HSS 116 stores subscription-related information such as user profiles, performs user authentication and authorization, and can provide information about the physical location of the user. When multiple HSSs are used in a network a SLF 118 can be used to direct the queries to HSS 116 storing the information. Legacy signaling networks may also use the HSS for services. MRFC 130 communicates with S-CSCF 114 and controls the MRFP 132 to implement media related functions. The combination of MRFC 130 and MRFP 132 provides a source of media in the home network. BGCF 122 is a server that can route based on telephone number and is used when calling to a phone on the circuit switched network. MGCF 124 and MGW 126 are used to convert signaling from IMS to that which is appropriate for PSTN 128 circuit switched networks. The IP Multimedia Networks can include application servers and other network entities that provide services to User Equipment 120. The User Equipment (or mobile node) can include a cell phone, a personal digital assistant (PDA), or a laptop computer. AS 134 can provide location based services such as traffic reports or weather.

Figure 2:
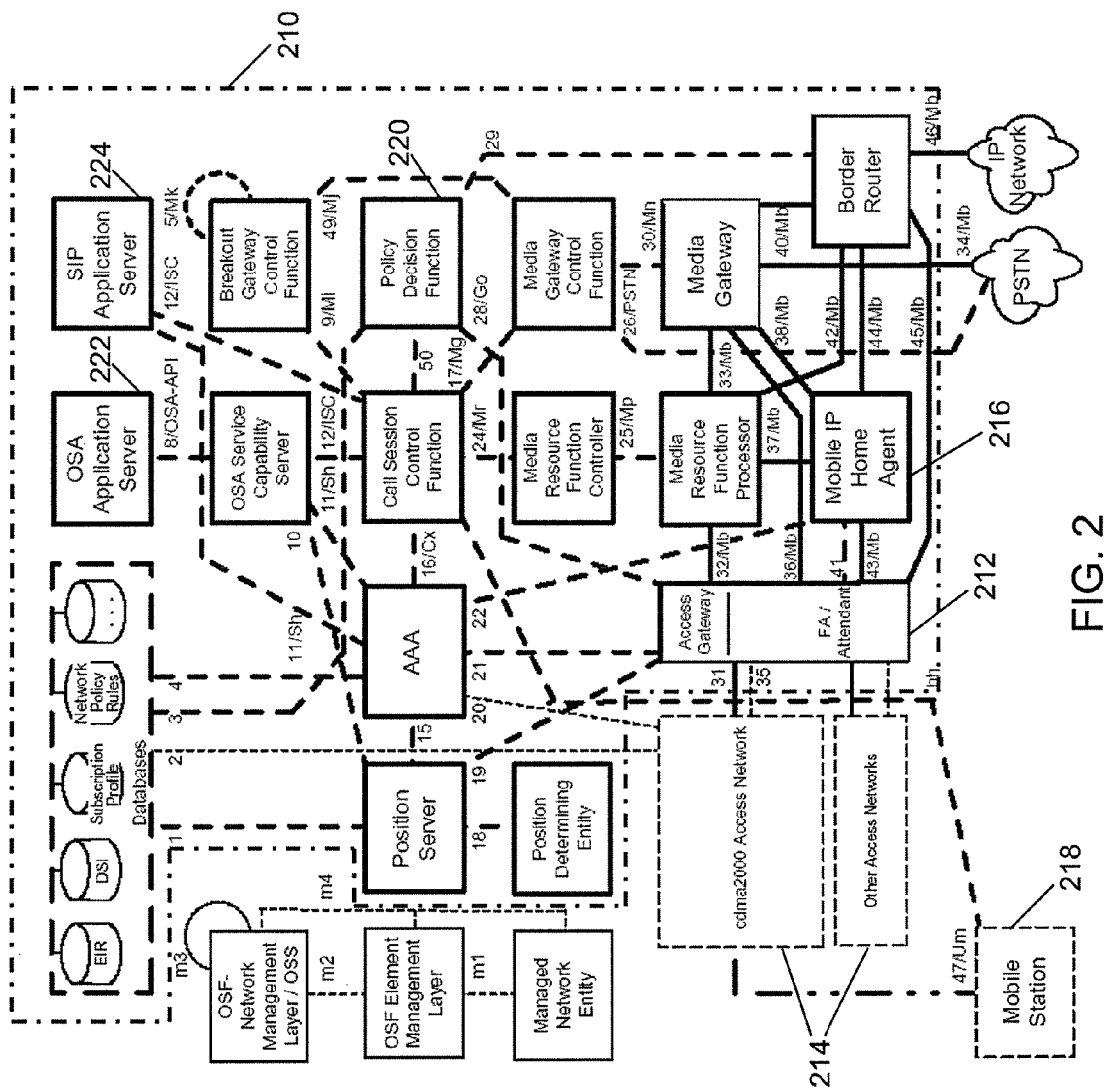
FIG. 2 is a functional block illustration of a Multimedia Domain (MMD) communication network in accordance with certain embodiments.

FIG. 2 illustrates a Multimedia Domain (MMD) system 210 within a larger network. The MMD system 210 includes many of the same functions as the IMS system of FIG. 1, but further includes an access gateway/foreign agent 212 to communicate with access networks 214, as well as a home agent 216 to provide Mobile IP support to mobile stations (or mobile node) 218. A policy decision function (PDF), which can be included in a IMS or MMD network stores policies governing a user's session. Application servers such as an open systems architecture (OSA) application server 222 and SIP application server 224 provide applications such as location based services, video, email, chat, gaming, and other data and multimedia content.

In the context of the IMS and MMD networks, a proxy-call session control function (P-CSCF) is the first point of contact when setting up a session on the network. The P-CSCF is typically located in the visited network, or in the home network when the visited network is not yet IMS compliant. The P-CSCF acts as a proxy and forwards messages from the user equipment or mobile station to the appropriate network entity and vice versa. The P-CSCF can perform a number of functions such as inspect the messages, provide SIP message compression/decompression using, e.g., SIGComp, provide a security association to the mobile node, and generate charging data records (CDR). The P-CSCF can provide these functions and others, in part, because the P-CSCF sits on the path of the message signaling. The P-CSCF can also include or communicate with a policy decision function (PDF) that authorizes media resources such as the quality of service (QoS) provided, management of bandwidth, and access provided.

The I-CSCF is the contact point within a network for connections destined to a user of that network or a roaming user currently located within the network's service area. The I-CSCF assigns a S-CSCF to a user so that the user can communicate with the network. The I-CSCF's IP address is published in the DNS of the domain typically so that remote servers can find it and use it as an entry point.

The S-CSCF performs the session control services for the mobile node or handset. This includes handling registrations of the mobile node, inspecting messages being routed through the S-CSCF, deciding the application server to provide service, providing routing services such as sending messages to the chosen application server or to a the PSTN, and enforcing the policies of the network for a given user. The S-CSCF communicates with the HSS to access user profiles and other information.

Application servers, e.g., application server 222 or 224 shown in FIG. 2, host and execute services such as caller ID, call waiting, call holding, push-to-talk, call forwarding, call transfer, call blocking services, lawful interception, announcement services, conference call services, voicemail, location based services, and presence information. The application servers can interface with the S-CSCF using SIP and depending on the service can operate in a SIP proxy mode, a SIP user agent mode, or a SIP back-to-back user agent mode.

Figure 3:
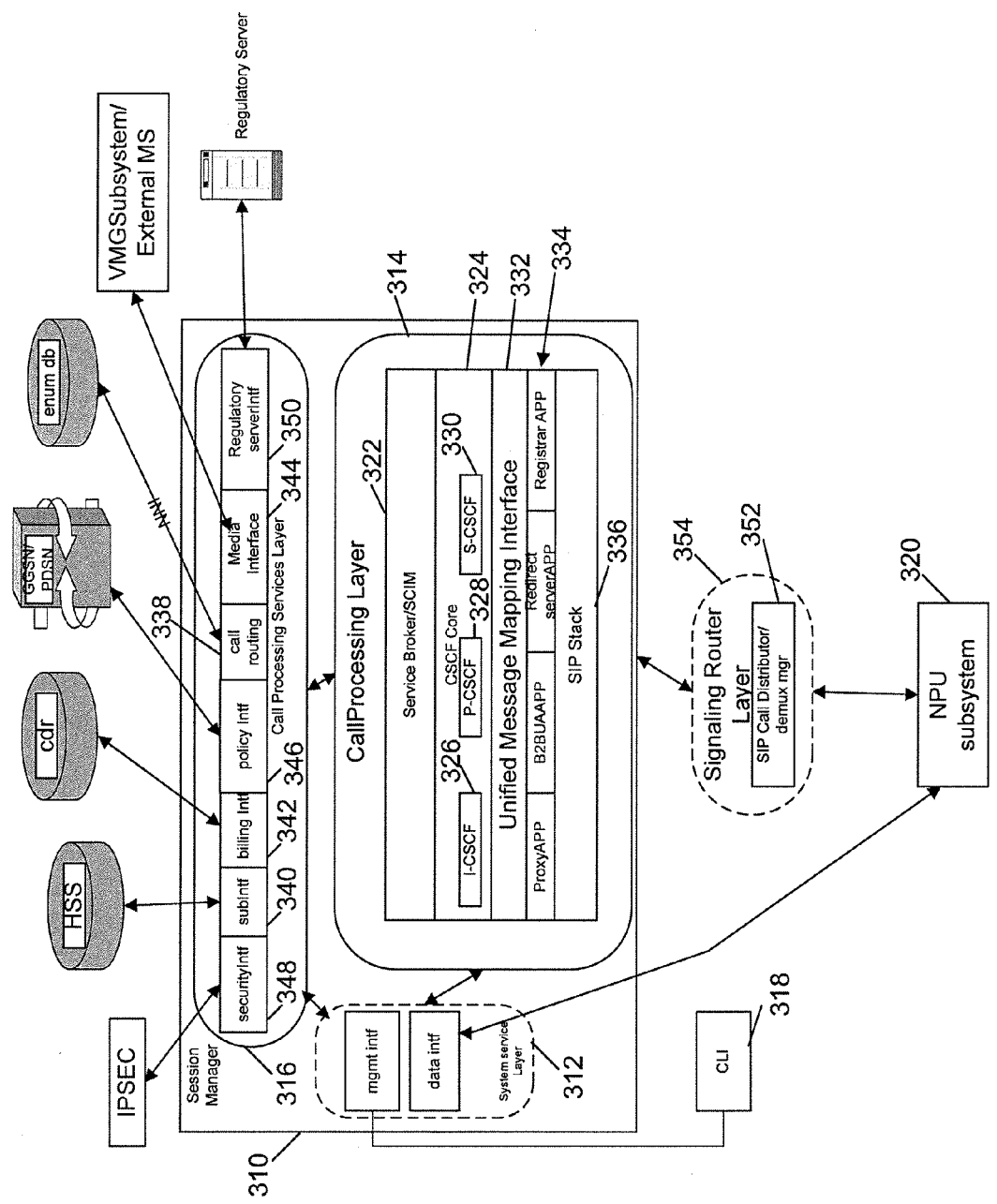
FIG. 3 is an illustration of a control plane of a gateway in accordance with certain embodiments.

FIG. 3 illustrates a control plane architecture for a gateway implementing a IMS/MMD CSCF solution in accordance with certain embodiments. A session manager 310 services and processes user session data flow for user equipment/mobile subscribers. Session manager 310 includes functional layers such as a system service layer 312, a call processing layer 314 and a call processing support services layer 316. The system services layer 312 provides an interface for instructions to be passed to the session manager and the other layers. A command line interface (CLI) 318 as well as network processing unit 320 interface are included. The call processing layer 314 includes a service broker/ Service Control Interaction Manager (SCIM) 322, a CSCF core 324 that includes an I-CSCF 326, P-CSCF 328, and S-CSCF 330, a unified message mapping interface 332, applications 334, and a SIP stack 336. In some embodiments, the CSCF core includes one of the CSCF functionalities, for example, the P-CSCF. The call processing support services layer 316 includes a variety of services such as routing and address translation service 338, subscriber management service 340, changing interface service 342, media interface service 344, QoS policy interface service 346, security interface 348, and regulatory server interface 350. A demux manager 352 resides in the signal routing layer 354, as shown in FIG. 3. The signal routing later 354 with the demux manager can determine where a traffic flow is sent for processing. The traffic flow can be sent to a process instance for further processing and/or signal handling.

The gateway in FIG. 3 can implement a registrar and redirect server. A registrar allows the SIP user to register the contact (ip address/domain name) where the SIP user can be reached. It is a location service that allows binding between the logical address/public identity of the SIP user with the physical address. A SIP proxy or redirect server can locate the user by contacting the registrar. The gateway can implement a registrar in conjunction with S-CSCF. The P-CSCF and I-CSCF may proxy the registrations. If gateway is acting as a S-CSCF registrar, registrar APP 334 can contact the CSCF-Core to get the authentication vector and subscriber information. The registrar APP 334 can perform all the SIP specific registrar functionality, but take directions from S-CSCF component in CSCF core in some embodiments.

The gateway may maintain a local cache where per service or session information can be stored. The gateway may also inform the demux manager of any changes in the registration status because demux manager can maintain a hash with subscriber information. The local cache can store the following information: IP address, address of record(AOR)/public user identity, private user identity (unique for a subscriber, e.g., IMSI, NAI, MSISDN), contact, registration expiry, registration status (active, expired), service route header, authentication vector, and subscriber profile. The location information can be correlated with the IP address. This can allow the gateway to select an application server that is local to the mobile node to provide local services. In some embodiments, location information can be stored in the local cache such as geographic location, coordinate information, or relative location information to allow an application server to determine the location based service applicable to the mobile node. The local cache entry may be deleted once the subscriber deregisters and may maintain one such entry for every public user identity for that subscriber.

Looking at the call processing layer 314, this layer includes signaling protocols and call control using universal SIP as an application program interface (API). The signaling protocols can be SIP or can be other protocols like ISUP, MGCP, or H.323. Further, the call processing layer 314 allows interworking between SIP variants and other protocols through a unified mapping interface (UMM). The unified mapping interface can convert protocol specific messages and parameters to the universal SIP like API format. SIP like messaging is used, in some embodiments, because SIP has the largest message set and can cover the possible messaging scenarios for SIP and the other protocols. The call processing layer 314 can also provide transparency to data that need not be processed by the CSCF core by placing that information into an envelope. Parameters that are not of interest can be placed in an envelope and remain unmodified. The CSCF core allows any text string as the calling and called number, the number does not need to be restricted to an E.164 number. The number could be, for example, an Address of Record (AoR) or any name string with a domain name.

Figure 4:
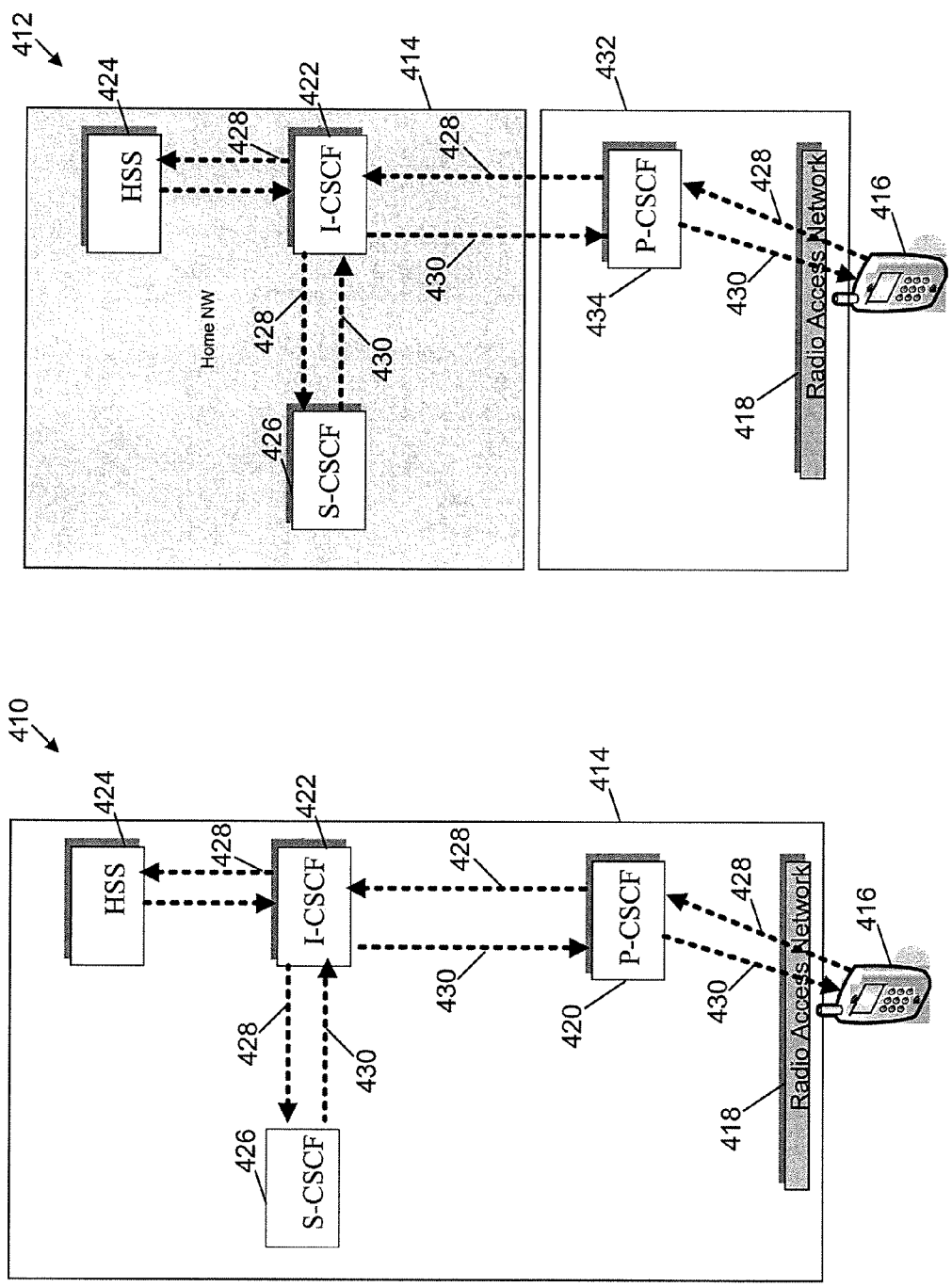
FIG. 4 is an illustration of registration in a communication network in accordance with certain embodiments.

FIG. 4 illustrates registration in a home network 410 and registration involving a visited network and a home network 412 in certain embodiments. The home network 414 is the network with which mobile node 416 is associated. A radio access network 418 provides a radio frequency (RF) link and can connect to the network. Home network 414 includes P-CSCF 420, I-CSCF 422, HSS 424, and S-CSCF 426. A registration message 428 is sent in order to register mobile node 416. The S-CSCF handles registration and call handling, among other things. In registration handling, the S-CSCF validates the authentication information received after the first time registration before sending a positive response. The S-CSCF may also check the configured value of how many public user identities are allowed to be registered for that private entity. If the new registration is exceeding the limit, it can return a 403 response. If it is the first time registration, the S-CSCF sends a request to HSS to get an authorization vector for the subscriber. The authorization vector includes certain parameters, which may be stored by the S-CSCF, while a response 401 is returned.

When the registration is complete, the S-CSCF may store the subscriber data in a local cache. The S-CSCF may also send a message to the signal routing layer to store the subscriber data. The contact information for a non barred public user id may be stored. It can add the list of received path headers and P-Associated URI with a list of public user identities to the 200 OK 430 before returning the result to the callLeg. A callLeg is one direction of a traffic flow in some embodiments.

The S-CSCF can also add the service route header with the S-CSCF information to indicate that future requests may be routed from P-CSCF to S-CSCF. If topology hiding is enabled it should add the I-CSCF as the topmost URI in the service route header. In handling calls, when the S-CSCF receives an incoming invite from the mobile node it checks if the public user identity is barred in the P-Asserted-Id sends response as 403, in certain embodiments. If it is not barred it can remove its own SIP URI from the topmost route header. The S-CSCF stores the value of the ICID parameter. The S-CSCF can then insert an orig-ioi parameter to identify the sending network and insert a P-charging-Address header if the call is being forwarded within the same home network.

If the CSCF has the knowledge of the tel URL for the SIP URI included in the P-asserted-ID header a second P-Asserted-ID header with the tel URI is added. Additionally, if the network topology hiding is requested, the CSCF puts the address of the I-CSCF in the topmost route header and returns the result to the callLeg so that the call can be proxied.

In visited to home network registration 412, mobile node 416 is in communication with a visited network 432. The mobile node 416 may be roaming or otherwise outside home network 414. Radio access network 418 provides a communication link to visited network 432. P-CSCF 434 receives registration message 428 from mobile node 416 and directs registration message 428 to I-CSCF 422. In some embodiments, registration message 428 may be modified by one or more network devices such as the P-CSCF, the I-CSCF, the HSS, or the S-CSCF.

Figure 5:
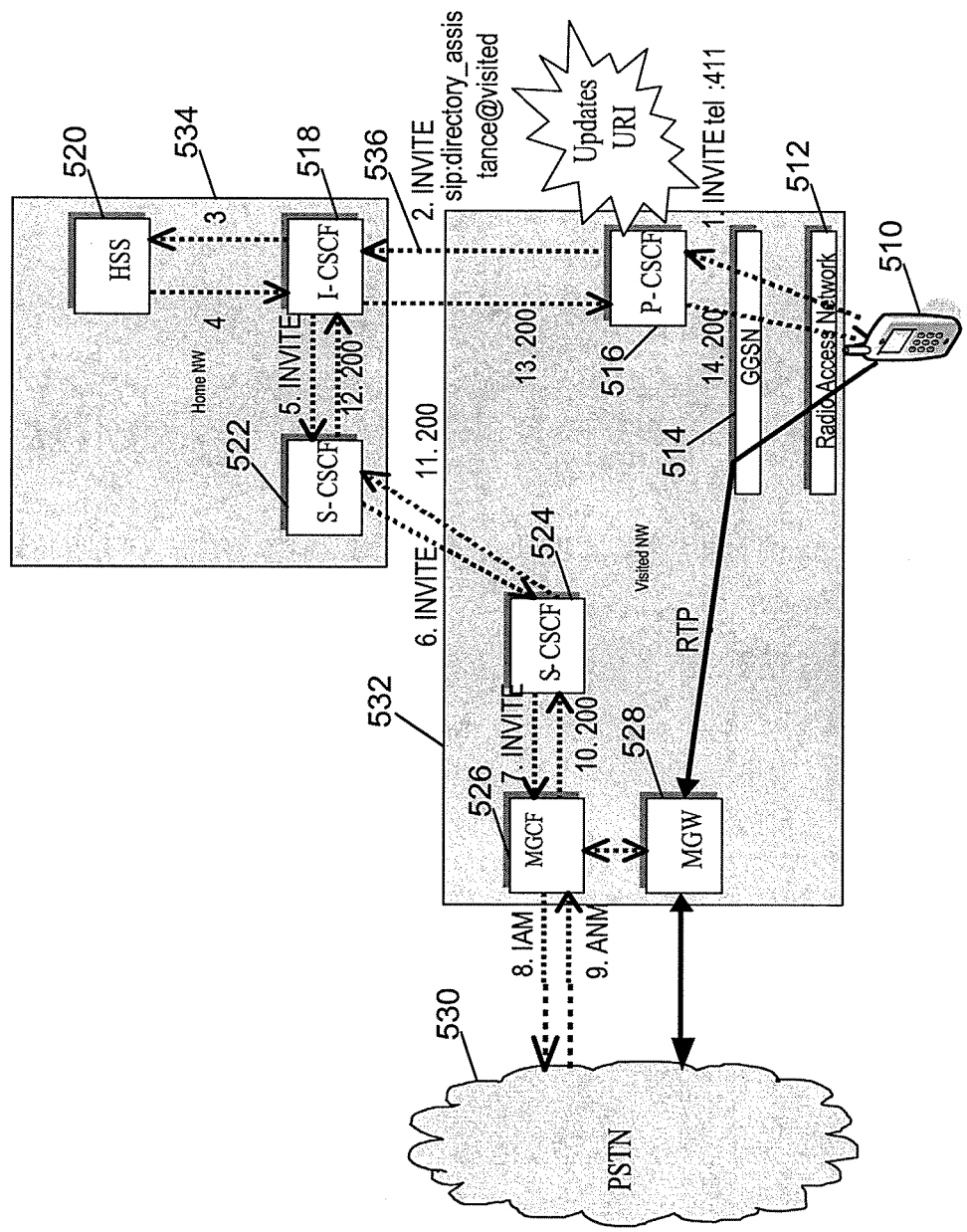
FIG. 5 is a logical diagram of local service handling in a P-CSCF and PSTN interchange with IMS/MMD systems in accordance with certain embodiments.

FIG. 5 illustrates local service handling in a P-CSCF and PSTN interchange with IMS/MMD systems in accordance with some embodiments. FIG. 5 includes a mobile node 510, a radio access network (RAN) 512, a GGSN 514, a P-CSCF 516, an I-CSCF 518, a HSS 520, a S-CSCF 522, a visited network S-CSCF 524, a media gateway control function (MGCF) 526, a media gateway (MGW) 528, and a public switched telephone network (PSTN) 530. In some embodiments, services can have certain dialing patterns associated with them, e.g., directory assistance 411, and are recognized in certain areas by that pattern. The same dialing pattern may mean a different service in a visited network 532 versus a home network 534, e.g., *86 may be used for voicemail access in home network 534, but may have different service associated with it in the visited network 532. In some embodiments, the call session control function (CSCF) is programmable to allow operators to define their own locally abbreviated dialing strings as a service. The local service detection can occur at P-CSCF 516 who is aware of the dialed pattern associated with the local services to avoid any issue with service interpretation.

This local service detection and translation is explained with reference to FIG. 5. Mobile node 510 sends an invite message to P-CSCF 516, which includes information that the user has dialed telephone number 411. P-CSCF 516 can translate the received invite message and detect that the dialed pattern is a local service. In some embodiments, based on the routing configuration P-CSCF 516 routes the call to a local SIP AS (not shown) for servicing the call. This is explained in further detail below. In other embodiments, where there is no peering server table for routing to a SIP AS, P-CSCF 516 routes the call to the home network 534.

P-CSCF can send an invite 536, which can be an updated uniform resource identifier (URI) to I-CSCF 518. This update can be a modifying of the request URI. For example, a user dials 411 in the visited network and P-CSCF 516 modifies the request URI to directory_assistance@visited.com. P-CSCF 516 can use the configured translation rules to modify the request URI. In the home network, I-CSCF sends the invite to S-CSCF 522, which can route the call based on the request URI. If it is a type of service, e.g. directory assistance in North America, and user is dialing 411 the call can be routed to the home network and URI is modified in the home network to indicate that this service should be executed in the visited network. Thus, S-CSCF 522 route the call back to the visited network, to S-CSCF 524, for routing to MGCF 526 and to PSTN 530 where the service may be provided by an application server. In certain embodiments, a user dials *traffic in the visited network and P-CSCF modifies the request URI to be traffic_report@visited.com and sends it to an application server in the visited network without going through the home network. This can reduce signaling and resources used in the home network for localized services as the request is handled in visited network.

Figure 6A:
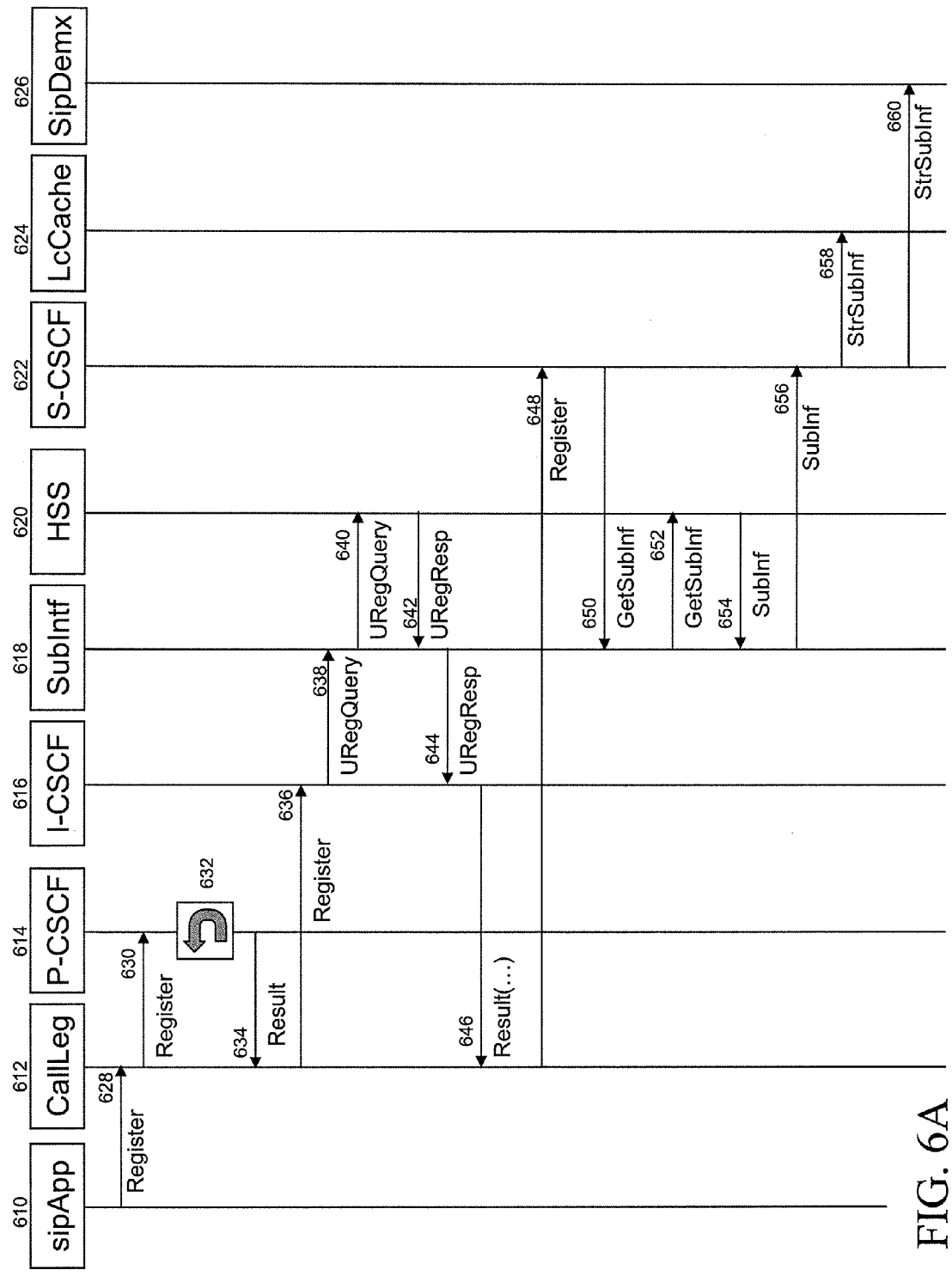
FIG. 6 is a signaling diagram of location based services messaging in accordance with certain embodiments.
Figure 6B:
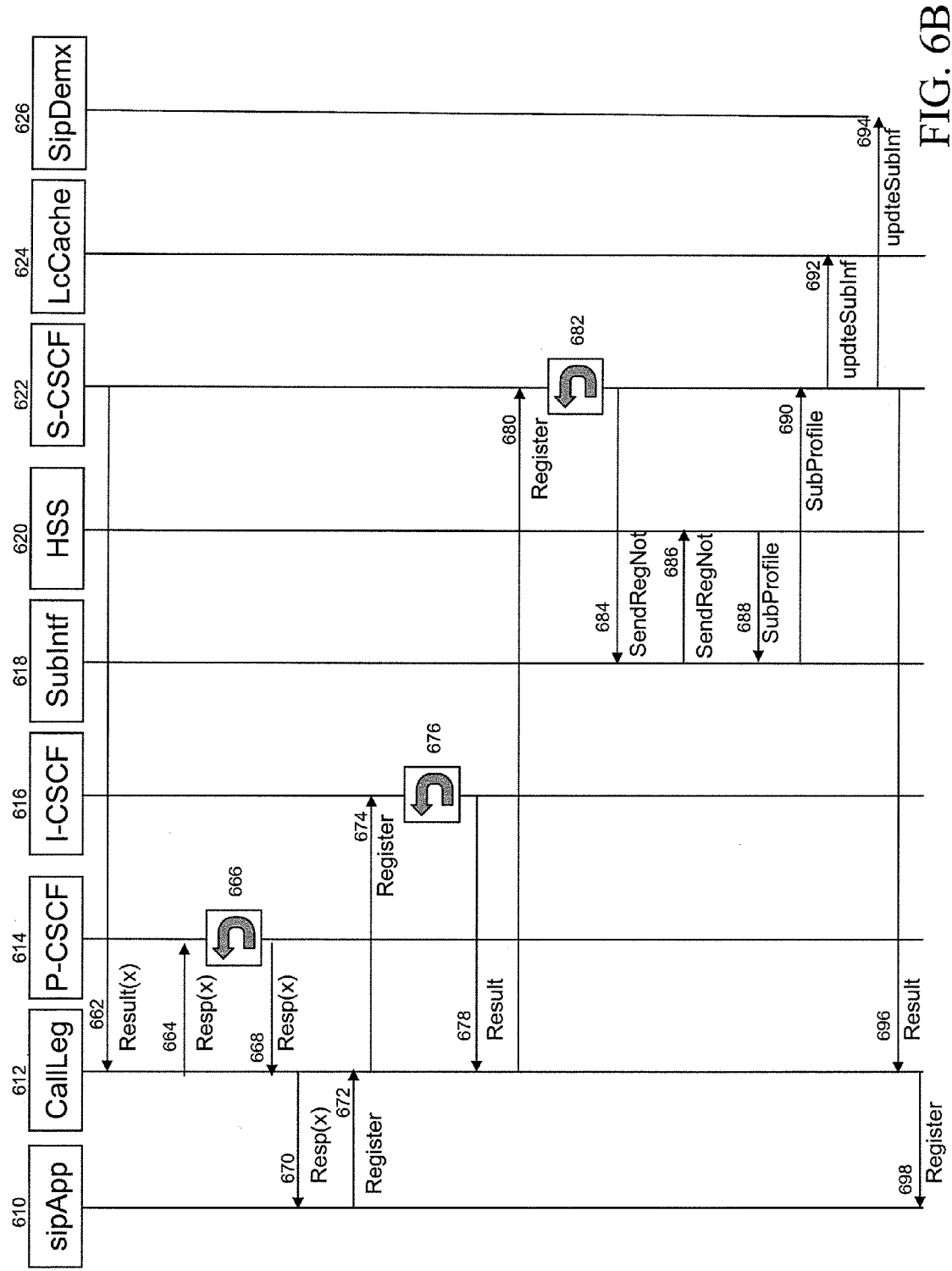

FIGS. 6A and 6B illustrate a registration call flow in accordance with some embodiments of the disclosed subject matter. FIGS. 6A and 6B include a mobile node 610, a callLeg 612, a P-CSCF 614, an I-CSCF 616, a subscriber interface (subintf) 618, a HSS 620, a S-CSCF 622, a local cache (lccache) 624, and a SIP demux 626. S-CSCF 622 can communicate with a registrar (not shown) that is within the gateway during this process. Mobile node 610 can send, at 628, a register message, such as a UMM_MSG_REGISTER, to a callLeg 612. CallLeg 612 can be a data structure located in, for example, a CSCF. CallLeg 612 can send, at 630, a register message to a P-CSCF 614. At 632, the P-CSCF can examine the register message, determine that it is a register message and send, at 634, a return message to the callLeg 612. In response, callLeg 612 can send, at 636, a register message to the I-CSCF 616. The I-CSCF 616 can send, at 638, a user registration query to a subscriber interface 618. The subscriber interface 618 can be, for example, software that is located in the call processing layer 320 of the session manager 310 of FIG. 3. Subscriber interface 618 can also store various data that can be part of a user profile and can be used for authentication both at the user level and the device level in the local cache 624.

Based on, for example, a user ID, user profile information, and/or services a user has requested, the subscriber interface 618 sends, at 640, a user registration query to Home Subscriber Server (HSS) 620 to request, for example, a S-CSCF to serve this user. HSS 620 can respond, at 642 with information identifying a S-CSCF as well as, for example, information identifying what network the user's call is coming from. HSS 620 can also determine, for example, whether a public ID of the user is associated with a private ID of the user in the message. The public ID can be, for example, the user's address of record. The private ID can be, for example, an International Mobile Subscriber Identity (IMSI). At 642, the information provided in the response can be passed to the I-CSCF 616, at 644, and the callLeg 612, at 646. If, for example, the user is calling from a network with no roaming agreement, the user can be denied service and such denial can be indicated in the result, at 646. At, 648, in response to receiving the result, at 646, and possibly based on the result, callLeg 645 can send a register message to the S-CSCF 670 (which can have been identified at 642 from HSS 620 and can be acting as an SIP registrar).

In response to receiving, at 648, a register message, the S-CSCF 622 can send, at 650, a request for subscriber information to the subscriber interface 618. As a result, the subscriber interface 618 requests, at 652, subscriber information from the HSS 620. The HSS 620 provides, at 654, this information to the subscriber interface which, in turn, passes, at 656, the information to the S-CSCF 622. This information can include, for example, the public user ID, the private user ID, contact, registration expiry, registration status (e.g., active, expired), service route header/path header, an authorization vector (including, for example, the user's encrypted password, encrypted responses to user challenge questions, user challenge questions, and site keys), and/or a subscriber profile. The S-CSCF 622 can store, at 658 and/or 660 various parts of the subscriber information in a local cache 624 and/or a SIP Demux 626.

The S-CSCF 622 can send, at 662 (FIG. 6B), a message along with at least some of the subscriber information to the callLeg 612. This message can be, for example, a ReturnResult_401 message. In addition, this message can include a site key. In some embodiments, if, for example, this is the first time a user has logged on to the network using this particular mobile device, the user may be required to answer at least one challenge question such as, "what is your favorite color" or "what is your oldest sister's first name." Challenge questions can be retrieved from, for example, the HSS 620, a web server, cache 624, SIP Demux 626, and/or may have been received, at 656, in subscriber information. In response to receiving, at 662, the return result message, the callLeg 612, can send, at 664, a response message to P-CSCF 614. P-CSCF 614 can set up, at 666, a tunnel, such as a Security Association (SA) tunnel between the P-CSCF 614 and the mobile device. P-CSCF 614 can send, at 668, a response message back to callLeg 612 and callLeg 612 can send, at 670, a response message to mobile node 610. In some embodiments, for example if a tunnel is not to be set up by the P-CSCF 614 in response to receiving, at 662, the return result message, the call leg 612, can send, at 670, a message response to the mobile node 610.

After receiving a response from the mobile node 610, at 672, a register message is sent to callLeg 612. I-CSCF 616 can validate, at 676, that the register message, received at 674, is associated with the same user as the register message received at 628. This validation can be performed by comparing a user ID in the register message received at 674 with information stored, for example, in cache 624. Upon successful validation, the I-CSCF 616 can send, at 678, a return result message indicating that validation was successful to callLeg 612. The callLeg 612 can send, at 680, a register message, to S-CSCF 622. At, 682, the S-CSCF can verify that various pieces of information received, at 680, are correct. For example, answers to challenge questions, passwords, and/or private user IDs can be verified.

S-CSCF 622 can send, at 684, a registration notification to subscriber interface 618 indicating that the mobile device and the user are to be authorized and authenticated. In response, subscriber interface 618 can send, at 686, registration notification to HSS 620. HSS 620 can respond, at 688, with the user's subscriber profile and subscriber interface 618 can send, at 690, the same to S-CSCF 622. S-CSCF 622 can update all or parts of the subscriber information in the cache 624 and/or the SIP demux 626 by sending messages, at 692 and/or 694. The S-CSCF can also send, at 696, an indication of a successful authentication and authorization to callLeg 616. CallLeg 616 can send, at 698, a register message such as a UMM_MSG_200OK_REGISTER to mobile node 610 and the user can begin to use the network.

Once a mobile node has registered with the communication network, the information is cached in the gateway and/or stored in the HSS and the information can be used to obtain location information regarding the mobile node. That location information can be correlated with the IP address in the HSS, the local cache in the gateway, and/or a location registration function (LRF). The location information obtained can be any information that places the mobile node at a physical location. This location information can be used, for example, when a mobile node is not able to send location information. This may be the case in non-IMS compliant mobile nodes. Also mobile nodes that are being interworked, for example, by a packet date interworking function (PDIF), such as dual mode mobile node which is operating in a Wi-Fi network. By correlating the location information with the mobile node's IP address and updating the location information when a mobile node re-registers, the location information can be served to other network components to provide location based services. This can include emergency services as well as traffic advisories, transit advisories, and restaurant information, for example.

Figure 7:
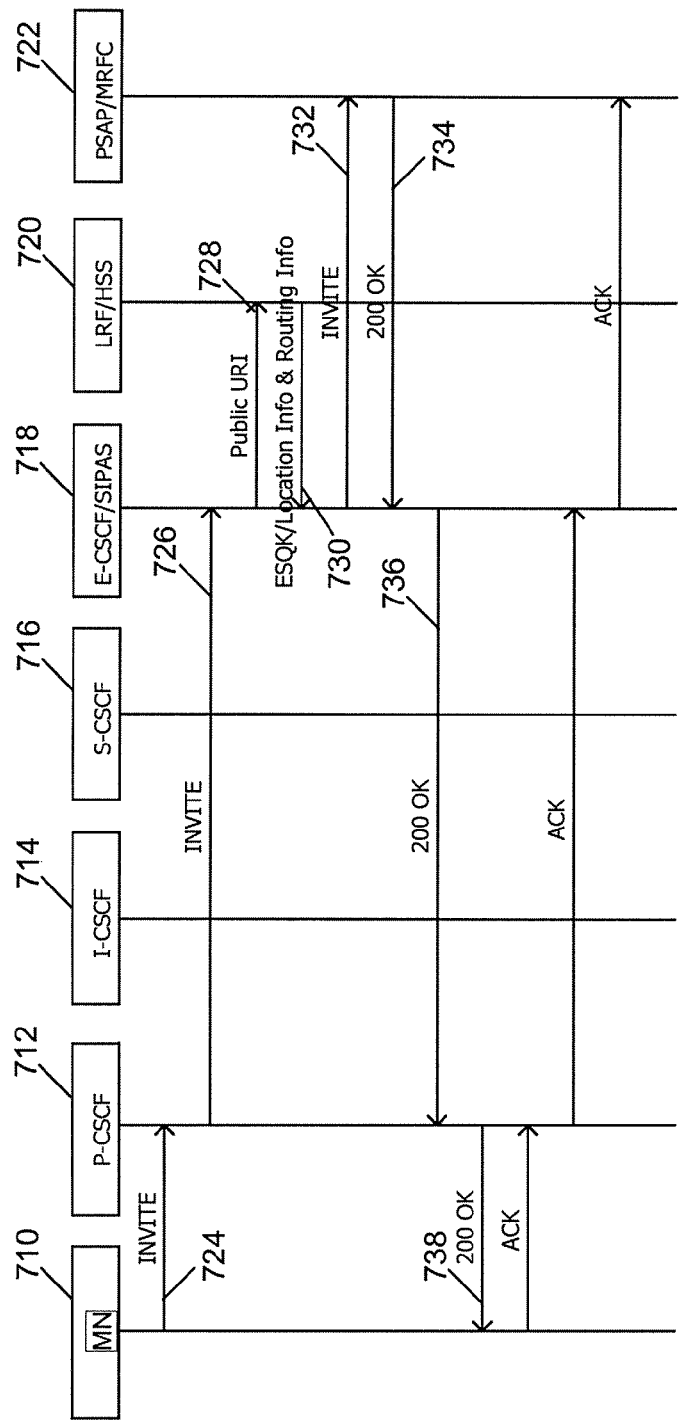
FIG. 7 is a signaling diagram of an emergency call in accordance with certain embodiments.

FIG. 7 illustrates messaging using location information in an emergency call in accordance with certain embodiments. FIG. 7 includes a mobile node 710, a P-CSCF 712, an I-CSCF 716, an E-CSCF/SIP-AS (emergency-call session control function/session initiation protocol-application server) 718, a location registration function/home subscriber server (LRF/HSS) 720, and a public service answering point/multimedia resource controller (PSAP/MRFC) 722. The emergency call can be initiated with an invite message 724, which is received at P-CSCF 712 in the visited network. The visited network can use cached information that correlates the IP address with location information to send the message to an E-CSCF/SIP-AS 718 in the visited network. This can bypass the home network reducing delay. The E-CSCF/SIP-AS 718 contacts the LRF/HSS 720 with a public URI 728 to obtain emergency service query key (ESQK) and/or location information and routing information 730, which can be used to direct the call to the closest PSAP 722. An invite 732 is sent to PSAP/MRFC 722 to initiate a SIP based voice call. A 200 OK message 734 can be used to pass information and setup the voice call. E-CSCF/SIP-AS 718 passes a 200 OK message 736 to P-CSCF 712, which passes a 200 OK 738 message to MN 710. Acknowledgement messaging can be passed back before beginning the emergency call. In the example of FIG. 7, location information is used to route from the P-CSCF 712 to E-CSCF 718 and in some embodiments can be passed to the E-CSCF/SIP-AS from the cache of the gateway, which can implement a P-CSCF. This can allow a mobile that that is not capable of sending location information to use location based services.

Figure 8:
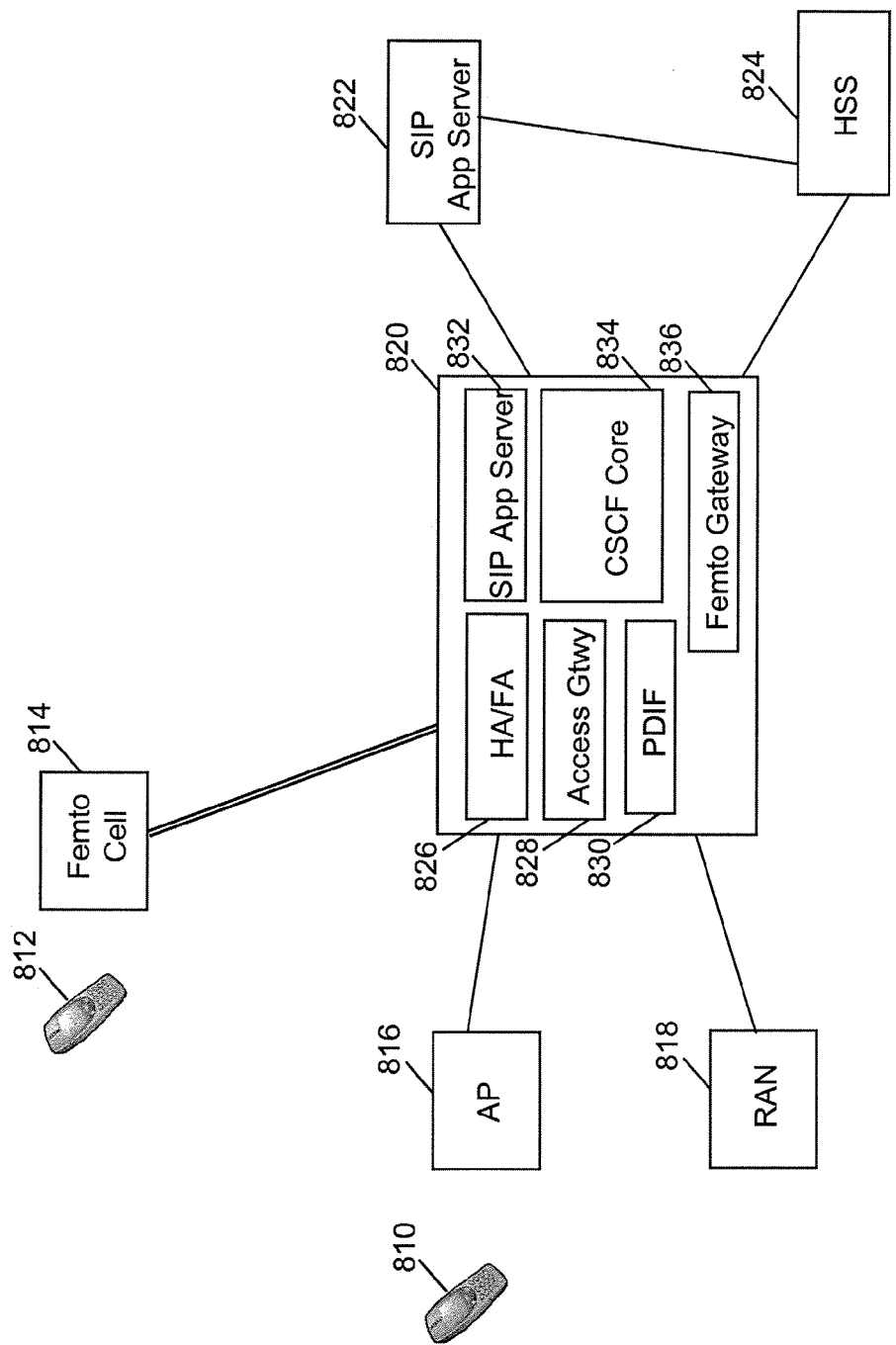
FIG. 8 is a network topology for providing location based services in accordance with certain embodiments.

FIG. 8 illustrates a topology where location based services are provided to mobile nodes in accordance with certain embodiments. FIG. 8 includes a dual mode mobile node 810, a mobile node 812, a femto cell 814, a WiFi access point 816, a radio access network (RAN) 818, a gateway 820, a SIP application server 822, and a home subscriber server (HSS) 824. The gateway can include logical functions such as a home agent/foreign agent (HA/FA) 826, an access gateway 828, a packet data interworking function (PDIF) 830, a SIP application server 832, a CSCF core 834, and a femto gateway 836. The dual mode mobile node 810 can operate on a WiFi network and a cellular network such as CDMA or UMTS (through a RAN 818). Access point 816 can interconnect to a service provider's network to make voice calls through a PDIF 830 in some embodiments. A mobile node receiving service through a PDIF or other interworking function may not be able to pass location based information in messaging. Location based services can be extended to the mobile node by retrieving the location based information using other registration information and then caching and correlating the information with the mobile node's identifying information, such as IP address. In some embodiments, the WiFi access point 816 access the network through PDIF 830, which can be local to the access point. The location information of PDIF 830 can be used to determine the relative location of the mobile node and location based requests from the mobile node can be routed locally in the visited network.

The P-CSCF, which can reside in the CSCF core 834, can provide location based service routing. For example, by using the cached information or a peering server table the P-CSCF can route the mobile node's request within the visited network to an application server to provide location based services local to the mobile node (e.g., application services in the visited network such as SIP app servers 822 and 832). In some embodiments, the location based information can be stored and updated in HSS 824 and can be retrieved by SIP application server 822.

The gateway described above is implemented in a chassis in some embodiments. This chassis can implement multiple and different integrated functionalities. In some embodiments, an access gateway, a packet data serving node (PDSN), a foreign agent (FA), or a home agent (HA) can be implemented on a chassis. Other types of functionalities can also be implemented on a chassis in other embodiments are a Gateway General packet radio service Serving Node (GGSN), a serving GPRS support node (SGSN), a packet data inter-working function (PDIF), an access service network gateway (ASNGW), a base station, a access network, a User Plane Entity (UPE), an IP Gateway, an access gateway, a session initiation protocol (SIP) server, a proxy-call session control function (P-CSCF), and an interrogating-call session control function (I-CSCF). In certain embodiments, one or more of the above-mentioned other types of functionalities are integrated together or provided by the same functionality. For example, an access network can be integrated with a PDSN. A chassis can include a PDSN, a FA, a HA, a GGSN, a PDIF, an ASNGW, a UPE, an IP Gateway, an access gateway, or any other applicable access interface device. In certain embodiments, a chassis is provided by Starent Networks, Corp. of Tewksbury, Mass. in a ST16 or a ST40 multimedia platform.

The features of a chassis that implements an enterprise access gateway, in accordance with some embodiments, are further described below. The chassis includes slots for loading application cards and line cards. A midplane can be used in the chassis to provide intra-chassis communications, power connections, and transport paths between the various installed cards. The midplane can include buses such as a switch fabric, a control bus, a system management bus, a redundancy bus, and a time division multiplex (TDM) bus. The switch fabric is an IP-based transport path for user data throughout the chassis implemented by establishing inter-card communications between application cards and line cards. The control bus interconnects the control and management processors within the chassis. The chassis management bus provides management of system functions such as supplying power, monitoring temperatures, board status, data path errors, card resets, and other failover features. The redundancy bus provides transportation of user data and redundancy links in the event of hardware failures. The TDM bus provides support for voice services on the system.

The chassis supports at least two types of application cards: a switch processor card and a packet accelerator card. The switch processor card serves as a controller of the chassis and is responsible for such things as initializing the chassis and loading software configurations onto other cards in the chassis. The packet accelerator card provides packet processing and forwarding capabilities. Each packet accelerator card is capable of supporting multiple contexts. Hardware engines can be deployed with the card to support parallel distributed processing for compression, classification traffic scheduling, forwarding, packet filtering, and statistics compilations.

The packet accelerator card performs packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing. The line cards when loaded in the chassis provide input/output connectivity and can also provide redundancy connections as well.

In some embodiments, a ST40 embodiment of the chassis can support a system management card (SMC) and a packet services card (PSC). The system management card is a system control and management card for managing and controlling other cards in the chassis. The packet services card is a high-speed processing card that provides multi-threaded point-to-point, packet data processing, and context processing capabilities, among other things.

The operating system software can be based on a Linux software kernel and run specific applications in the chassis such as monitoring tasks and providing protocol stacks. The software allows chassis resources to be allocated separately for control and data paths. For example, certain packet accelerator cards can be dedicated to performing routing or security control functions, while other packet accelerator cards are dedicated to processing user session traffic. As network requirements change, hardware resources can be dynamically deployed to meet the requirements in some embodiments. The system can be virtualized to support multiple logical instances of services, such as technology functions (e.g., a PDSN, ASNGW, PDIF, HA, GGSN, or IPSG).

The chassis' software can be divided into a series of tasks that perform specific functions. These tasks communicate with each other as needed to share control and data information throughout the chassis. A task is a software process that performs a specific function related to system control or session processing. Three types of tasks operate within the chassis in some embodiments: critical tasks, controller tasks, and manager tasks. The critical tasks control functions that relate to the chassis' ability to process calls such as chassis initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a chassis include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the chassis by monitoring the various software and hardware components of the chassis. Recovery control task subsystem is responsible for executing a recovery action for failures that occur in the chassis and receives recovery actions from the high availability task subsystem. Shared configuration task subsystem provides the chassis with an ability to set, retrieve, and receive notification of chassis configuration parameter changes and is responsible for storing configuration data for the applications running within the chassis. Resource management subsystem is responsible for assigning resources (e.g., processor and memory capabilities) to tasks and for monitoring the task's use of the resources.

Virtual private network (VPN) subsystem manages the administrative and operational aspects of VPN-related entities in the chassis, which include creating separate VPN contexts, starting IP services within a VPN context, managing IP pools and subscriber IP addresses, and distributing the IP flow information within a VPN context. In some embodiments, within the chassis, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards. The session subsystem is responsible for processing and monitoring a mobile subscriber's data flows in some embodiments. Session processing tasks for mobile data communications include: A10/A11 termination for CDMA networks, GSM tunneling protocol termination for GPRS and/or UMTS networks, asynchronous PPP processing, packet filtering, packet scheduling, Difserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In some embodiments, the software needed for implementing a process or a database includes a high level procedural or an object-orientated language such as C, C++, C#, Java, or Perl. The software may also be implemented in assembly language if desired. Packet processing implemented in a chassis can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document.

Although the present invention has been described and illustrated in the foregoing exemplary embodiments, it is understood that the present disclosure has been made only by way of example, and that numerous changes in the details of implementation of the invention may be made without departing from the spirit and scope of the invention, which is limited only by the claims which follow.

We claim:

1. An access gateway in communication with a plurality of access networks including a wireless access network, the access gateway comprising:
  a local cache residing in the access gateway; and
  a call session control function (CSCF) residing in the access gateway and in communication with the local cache;
  wherein the access gateway serves as an access point to a multimedia domain (MMD) system in a network;
  wherein the plurality of access networks further includes at least one of a wireless local area network (WLAN) and a femtocell network; and
  wherein the CSCF is configured to:
    receive from a mobile node a registration request including registration information;
    generate location information of the mobile node using at least a part of the registration information and an Internet Protocol (IP) address assigned to the mobile node, wherein the location information includes a physical location of the mobile node and the IP address is assigned to the mobile node by the access gateway;
    store the generated location information in an entry in the local cache created for the mobile node when the mobile node was registered;
    receive a location-based service request including identifying information from the mobile node, wherein the identifying information includes an identifier of the mobile node;
    if the location-based service request does not include current location information of the mobile node,
      retrieve the generated location information of the mobile node from the local cache using the identifier of the mobile node included in the identifying information; and
      use the generated location information to obtain location-based services on behalf of the mobile node.

2. The gateway of claim 1, wherein the CSCF is further configured to send the location information to an external database for storage.

3. The gateway of claim 1, wherein the CSCF is further configured to route the location-based services request to an application server.

4. The gateway of claim 3, wherein the application server resides within a same visited network where the gateway resides.

5. The gateway of claim 1, wherein the location based services include providing information related to at least one nearest service.

6. The gateway of claim 1, wherein the mobile node includes a mobile node that is not capable of sending location information.

7. The gateway of claim 1, wherein the at least a part of the registration information includes a cell ID parameter.

8. A method comprising:
  receiving from a mobile node a registration request including registration information at a call session control function (CSCF) residing in an access gateway, which serves as an access point to a multimedia domain (MMD) system in a network, wherein the access gateway is in communication with a plurality of access networks including a wireless access network and at least one of a wireless local area network (WLAN) and a femtocell network;
  generating location information of the mobile node using at least a portion of the registration information and an Internet Protocol (IP) address assigned to the mobile node, wherein the location information includes a physical location of the mobile node and the IP address is assigned to the mobile node by the access gateway;

caching the registration information and the generated location information in an entry in a local cache created for the mobile node when the mobile node was registered, the local cache residing in the access gateway;

receiving from the mobile node a location-based services request including identifying information, wherein the identifying information includes an identifier of the mobile node;

if the location-based services request does not include current location information of the mobile node, retrieving the generated location information of the mobile node from the local cache using the identifier of the mobile node included in the identifying information; and routing the location-based services request using the generated location information to a network device that can provide the requested location-based services.

9. The method of claim 8, wherein the network device includes an application server.

10. The method of claim 9, wherein the application server resides within a same visited network where the CSCF that received the registration request from the mobile node resides.

11. The method of claim 8, further comprising providing the location based services to the mobile node.

12. The method of claim 11, wherein the mobile node includes a mobile node that is not capable of sending location information.

13. The method of claim 8, wherein the location based services include locating at least one nearest service.

14. The method of claim 8, wherein the at least a portion of the registration information includes a cell ID parameter.

15. Logic encoded in one or more tangible media that includes code for execution and when executed by a processor is operable to perform operations comprising:

receiving from a mobile node a registration request including registration information at a call session control function (CSCF) residing in an access gateway, which serves as an access point to a multimedia domain (MMD) system in a network, wherein the access gateway is in communication with a plurality of access networks including a wireless access network and at least one of a wireless local area network (WLAN) and a femtocell network;

generating location information of the mobile node using at least a portion of the registration information and an Internet Protocol (IP) address assigned to the mobile node, wherein the location information includes a physical location of the mobile node and the IP address is assigned to the mobile node by the access gateway;

caching the registration information and the generated location information in an entry in a local cache created for the mobile node when the mobile node was registered, the local cache residing in the access gateway;

receiving from the mobile node a location-based services request including identifying information, wherein the identifying information includes an identifier of the mobile node;

if the location-based services request does not include current location information of the mobile node, retrieving the generated location information of the mobile node from the local cache using the identifier of the mobile node included in the identifying information; and routing the location-based services request using the generated location information to a network device that can provide the requested location-based services.

16. The operations of claim 15, wherein the network device includes an application server.

17. The operations of claim 15, further comprising providing the location based services to the mobile node.

18. The operations of claim 15, wherein the location based services include locating at least one nearest service.

19. The operations of claim 15, wherein the mobile node includes a mobile node that is not capable of sending location information.

20. The operations of claim 15, wherein the at least a portion of the registration information includes a cell ID parameter.

* * * * *